July 24, 1934.  E. V. TAYLOR  1,967,382

BRAKE

Filed May 14, 1932

INVENTOR.
EUGENE V. TAYLOR
BY Jerome R. Cox
ATTORNEY.

Patented July 24, 1934

1,967,382

UNITED STATES PATENT OFFICE 1,967,382

BRAKE

Eugene V. Taylor, Chicago, Ill., assignor to Bendix Aviation Corporation, South Bend, Ind., a corporation of Delaware Application May 14, 1932, Serial No. 611,394

5 Claims. (Cl. 188—152)

This application relates to brakes. More particularly it concerns wheel cylinders for fluid pressure brakes and the mounting thereof.

One of the objects of the invention is to provide an improved mounting which permits the shifting of the fluid wheel cylinder to accommodate the position of the cylinder for movement of the friction elements associated therewith.

One of the features of the invention is a novel and efficient self-aligning bearing for a wheel cylinder.

Figure 1:
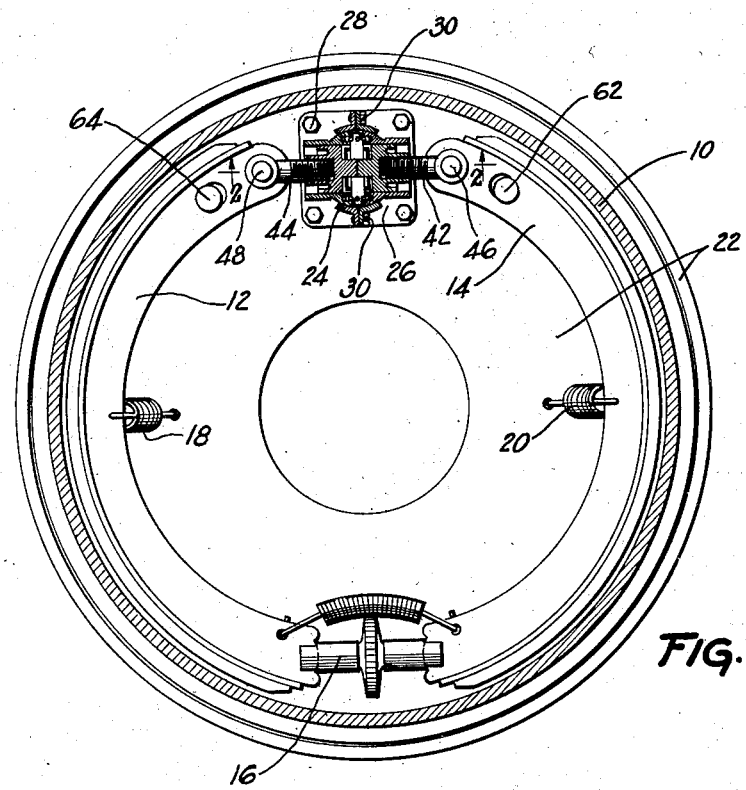
Figure 2:
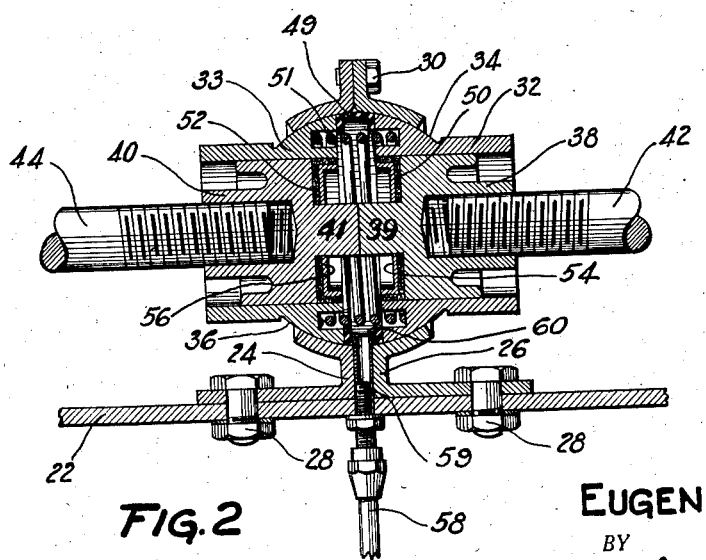

Further objects and features of the invention will be apparent after a reading of the subjoined specification and claims and after a consideration of the accompanying drawing in which:

Figure 1 is a view in vertical section of a wheel of an automobile provided with a brake and actuating means therefor constructed and arranged according to my invention; and Figure 2 is a view of a portion of the structure of Figure 1 shown in horizontal section and on an enlarged scale and taken substantially on the line 2—2 of Figure 1.

Referring in detail to the drawing, I have shown a vehicle wheel provided with a brake drum 10, and brake shoes 12 and 14 associated therewith. The shoes are connected by means of an adjustable link 16 and are normally held in released position by steady rests 18 and 20. The drum 10 is provided with a backing plate 22.

As is shown most clearly in Figure 2, there is secured to the backing plate 22 a pair of annular bearing members 24 and 26 each formed internally with a spherical shaped bearing surface. The members 24 and 26 are secured to the backing plate by bolts 28 and are secured to each other by bolts 30. Mounted in the bearing formed by the members 24 and 26 is a wheel cylinder formed of wheel cylinder sections 32 and 33. The sections 32 and 33 have portions of their external surface such as 34 and 36 formed with a spherical contour to fit within the internal spherical contour of the bearing members 24 and 26. Mounted within the cylinder formed by sections 32 and 33 are a pair of pistons 38 and 40 provided with inwardly extending projections 39 and 41 respectively. Shoe applying links 42 and 44 are connected to the pistons 38 and 40 respectively and at their opposite ends are pivotally connected as at 46 and 48 to the shoes 14 and 12 respectively.

An annular packing cup 49 is positioned between the sections 32 and 33 and forms a seal to prevent leakage of fluid through the joint formed between the members 24 and 26. A spring 51 maintains the sections 32 and 33 in contact with the bearings formed by the members 24 and 26 and this normally causes the sections 32 and 33 to act together as a unit. There is normally no angular movement between the two sections. A pair of annular packing cups 50 and 52 are associated with the pistons 38 and 40 respectively and are held in position by annular retaining cups 54 and 56 respectively. The projections 39 and 41 prevent the possibility of the cups 50 and 52 being crushed by the return of the pistons.

Fluid is introduced into the recess between the pistons 38 and 40 by means of a conduit 58 having a stem 59 which passes through the backing plate 22 and through an opening formed between the bearing members 24 and 26 into the space between the cylinder sections 32 and 33. The stem 59 is secured to the backing plate 22 and within the space between the cylinder sections, passes through a transverse opening formed in the annular cup 49. A flange 60 formed on the inner end of the stem 59 is normally maintained in sealing contact with the annular cap 49 by the pressure of the liquid and thus aids in preventing the passage of fluid out of the recess.

It is believed that the operation of the brake applying structure illustrated will be apparent from the above description. Liquid forced in through the conduit 58 passes to the interior of the recess formed between the pistons 38 and 40 and forces the pistons 38 and 40 in opposite directions thus moving the shoes 12 and 14 into contact with the drum 10. The wiping action moves the shoes into contact with one of the anchors 62 or 64 and the shoes thus apply a retarding influence upon the rotation of the drum 10. By reason of the mounting of the cylinder, the cylinders and the pistons therein may rotate about the longitudinal axis of the stem 59 to accommodate themselves to the position of the shoes 14 and 12.

It is to be understood that the above described embodiment of my invention is for the purpose of illustration only and various changes may be made therein without departing from the spirit and scope of the invention.

I claim:

1. In fluid brake apparatus a backing plate, a wheel cylinder formed with outer surfaces having a spherical contour, a pair of bearing members secured to said backing plate and formed with internal spherical surfaces cooperating with the exterior of said wheel cylinder, and means for supplying brake fluid under pressure to said wheel cylinder.

2. In fluid brake apparatus a backing plate, a wheel cylinder formed with outer surfaces having a spherical contour, a pair of bearing members secured to said backing plate and formed with internal spherical surfaces cooperating with the exterior of said wheel cylinder, and means comprising a supply conduit extending through said backing plate and between said bearing members.

3. In a fluid brake apparatus, a backing plate, a wheel cylinder formed with outer surfaces having a spherical contour, a pair of bearing members secured to said backing plate and formed with internal spherical surfaces cooperating with the exterior of said wheel cylinder, packing elements for said bearing members, and means for supplying brake fluid under pressure to said wheel cylinder.

4. In a fluid brake apparatus, a drum, a pair of shoes in said drum, a backing plate, a wheel cylinder formed with outer surfaces having a spherical contour, a pair of pistons in said cylinder each fastened to one of said shoes, a pair of bearing members secured to said backing plate and formed with internal spherical surfaces cooperating with the exterior of said wheel cylinder, and means for supplying brake fluid under pressure to said wheel cylinder.

5. In a fluid brake apparatus, a backing plate, a wheel cylinder formed with outer surfaces having a spherical contour, a pair of bearing members secured to said backing plate and formed with internal spherical surfaces cooperating with the exterior of said wheel cylinder, and means comprising a conduit connected to said cylinder and extending therefrom along a line diametrical of the cylinder, for supplying liquid under pressure to said cylinder.

EUGENE V. TAYLOR.